US006331986B1

(12) United States Patent
Mitra et al.

(10) Patent No.: US 6,331,986 B1
(45) Date of Patent: Dec. 18, 2001

(54) METHOD FOR RESOURCE ALLOCATION AND ROUTING IN MULTI-SERVICE VIRTUAL PRIVATE NETWORKS

(75) Inventors: Debasis Mitra, Summit; John A. Morrison, New Providence; Kajamalai Gopalaswamy Ramakrishnan, Berkeley Heights, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/065,506

(22) Filed: Apr. 24, 1998

(51) Int. Cl.$^7$ ........................................ H04J 3/16
(52) U.S. Cl. .................. 370/468; 370/238; 370/232; 370/252
(58) Field of Search .................... 370/252, 253, 370/254, 255, 256, 229, 230, 231, 232, 233, 234, 235, 236, 238, 468, 400, 401, 402, 409, 408, 395, 396, 397, 399, 389, 392

(56) References Cited

U.S. PATENT DOCUMENTS

| | | | | |
|---|---|---|---|---|
| 5,495,479 | * | 2/1996 | Galland | 370/252 |
| 5,600,638 | * | 2/1997 | Bertin et al. | 370/351 |
| 5,838,663 | * | 11/1998 | Elwalid et al. | 370/233 |
| 5,850,385 | * | 12/1998 | Esaki | 370/216 |
| 5,953,338 | * | 9/1999 | Ma et al. | 370/395 |
| 6,069,894 | * | 5/2000 | Holender et al. | 370/397 |
| 6,084,955 | * | 7/2000 | Key et al. | 379/220 |

OTHER PUBLICATIONS

D. Mitra, et al. "ATM Network Design and Optimization: A Multirate Loss Network Framework," *IEEE/ACM Transactions on Networking*, vol. 4, No. 4, p. 531 (1996).
D. Mitra, et al. "Hierarchial Virtual Partitioning: algorithms for virtual private networking," Proc. *IEEE Globecom*, p. 1784–1791 (1997).
J. S. Kaufmann, "Blocking in a shared resource environment," IEEE Trans. Commun., vol. COM–29, pp. 1474–1481 (1981).
J. W. Roberts, "Teletraffic models for the Telecom 1 integrated services network", *Proc. Int. Teletraffic Congress–10*, Session 1.1, paper #2.

* cited by examiner

*Primary Examiner*—Wellington Chin
*Assistant Examiner*—Steven Nguyen
(74) *Attorney, Agent, or Firm*—Martin I. Finston

(57) ABSTRACT

We describe a method for solving the joint problem of optimal routing and optimal bandwidth allocation in a network that supports plural subnetworks and plural communication services. Our method involves, for each source-destination pair communicating via a given subnetwork and a given class of service, determining a traffic rate to be offered to each of a set of permissible routes between that source and that destination, in the given subnetwork and service class. Our method further involves allocating a respective bandwidth to each link of each subnetwork. Significantly, the determinations of traffic rate to be offered, and the allocations of bandwidth to respective links of subnetworks, are performed in a mutually responsive manner.

29 Claims, 7 Drawing Sheets

METHOD FOR RESOURCE ALLOCATION AND ROUTING IN MULTI-SERVICE VIRTUAL PRIVATE NETWORKS

FIELD OF THE INVENTION

This invention relates to the design and management of communication networks of the kind that carry traffic corresponding to more than one kind of service. More particularly, the invention relates to methods for distributing traffic among available routes and allocating bandwidth resources to such routes in communication networks of that kind.

BACKGROUND OF THE INVENTION

Networks are commonly used for exchanging or transferring information between terminal communication devices such as computer terminals, telephones, facsimile machines, and computer file servers. FIG. 1 depicts an illustrative network. A typical network includes switching nodes such as nodes 10.1–10.8 of the figure, interconnected by links, such as links 20.1–20.10 of the figure. Each terminal communication device (not shown in the figure) is generally associated with one of the nodes.

Each link has a certain capacity, usually characterized as a bandwidth for that link. Networks may carry information in various forms. However, the information is often formatted into packets or cells, according to appropriate networking protocols.

One such networking protocol is Asynchronous Transfer Mode (ATM). ATM is a networking protocol designed to efficiently support high-speed digital voice and data communications.

When information is to be exchanged between a pair of terminal communication devices, the network establishes a path between the nodes associated with those devices. In the discussion that follows, the originating node will often be referred to as the "source", and the destination node will often be referred to as the "destination". The flow of information of a given service type s through such an established path will often be referred to as a communication "stream" from the source to the destination.

We will use the term "physical path" to denote the source and destination for a given communication stream, together with intermediate nodes (if there are any), and the links that connect them. In networks of practical size and complexity, there will often be a set of multiple physical paths, each able to carry the given stream.

It should be noted that although a physical path may exist between a source S and a destination D, the full bandwidth of the links along that physical path may be unavailable to carry communication streams between S and D. That is, the network manager may specify a predetermined bandwidth for streams between S and D along each of the possible physical paths. The specified bandwidth may equal the full bandwidth, or some quantity less than the full bandwidth, or no bandwidth at all. The last case, of course, is equivalent to denying certain physical paths between S and D.

We use the term "logical path" or "virtual path" to denote a path between a given source and a given destination as defined by such bandwidth specifications. The use of these terms signifies that these paths are not determined purely by physical considerations, but instead that they are partly defined by parameters that can be specified and can be changed.

It will be clear from the foregoing discussion that individual virtual paths will often take up less than the full bandwidth physically available on the links that they occupy. Thus, it will often be the case that several virtual paths co-exist along part or all of a physical path. Stated another way, each link of the network may simultaneously support several virtual paths.

An important advantage of virtual paths is that they can be arranged into subnetworks for serving the various users of the network, and that these subnetworks can be redimensioned (i.e., the bandwidth specifications along the various virtual paths can be revised) from time to time to serve changing traffic requirements.

The problem of allocating bandwidth to all of the virtual paths in the network, according to source-destination pair, subnetwork, and class of service, is referred to as logical network design. One important element of logical network design is the problem of selecting a set of physical paths through the network having sufficient capacity for carrying the estimated traffic of a communication stream. The process that carries out solutions to this problem may take into account such factors as the network topology, the currently available buffer space at the nodes, and the currently available link capacities.

Significantly, the network operator may have quality-of-service commitments with its customers, such as guaranteed bandwidth or maximum cell-loss probability. The path-selection process may also take into account such commitments.

As noted, certain networks, particularly high-speed networks, may support the networking protocol known as ATM. Such high-speed networks will typically carry multiple services having different traffic characteristics, including both constant bit rate traffic and variable bit rate traffic. An important simplification in dealing with variable bit rate traffic in ATM networks is provided by the concept of effective bandwidth, which is described in detail in U.S. patent application Ser. No. 08/506160, "A Method for Admission Control and Routing by Allocating Network Resources in Network Nodes."

Although buffering capacity plays an important role in ATM networks as a complement to bandwidth, this model subsumes the considerations related to buffering into the effective bandwidth. As a consequence, when variable bit rate traffic is characterized in terms of its effective bandwidth, any ATM network may be viewed (for call-handling purposes) as a multirate, circuit-switched, loss network in which the description of each service includes a characteristic bandwidth requirement (or rate) for each link that carries the service.

In a simple circuit-switched loss network model that is useful for our purposes, each service route (or "virtual path") is treated as a communication channel spanning a relatively large bandwidth, and that can be subdivided into many smaller-bandwidth subchannels. Many calls are multiplexed on the virtual path. Each call occupies one or more of the subchannels. For our model, it is convenient to assume that this occupation is exclusive throughout the duration of the call. A subchannel carrying a call is referred to as a "switched virtual circuit" or "switched virtual connection." Bits are assumed to be emitted by each source at a constant rate (corresponding to the effective bandwidth for the pertinent service). Those familiar with Internet Protocol (IP) communications will appreciate that the traffic entities known as "flow" and "connection" refer to the IP counterpart of the switched virtual circuit. (In regard to IP, the protocol known as RSVP is invoked for reserving resources in source-destination paths, and thus it brings the IP concept of "flows" nearer the ATM concept of switched virtual circuits.)

Even when the conveniences afforded by the effective bandwidth model are applied to network analysis, the problems of bandwidth allocation and routing can be very difficult. One source of difficulty is the fact that in contrast to permanent virtual circuits, virtual circuits arrive, hold network resources for some time, and then depart. As a consequence, it is necessary to take into account the randomness of call arrivals and call holding times. A second source of difficulty is the large potential link capacity in these networks, which may reach thousands, or even tens of thousands, of circuits in the near future. Yet a third source of difficulty is the large potential number of different services that these networks may carry. This number is expected to reach several hundreds of services in the near future, and even more thereafter.

There are well-known techniques for analyzing single-rate circuit switched networks. With the help of such techniques, bandwidth allocation and routing can be usefully performed, at least in the simpler networks. However, when multiple rates are introduced, the sources of difficulty mentioned above, among others, conspire to reduce the computational tractability of problems of practical interest.

The co-inventors named herein have made a significant contribution to the design problem in a multirate circuit switched network. This contribution involves a routing method. This method is described in D. Mitra, et al., "ATM Network Design and Optimization: A Multirate Loss Network Framework," *IEEE/ACM Transactions on Networking* 4 (August 1996) 531–543, referred to below as Mitra et al. This method is also described in U.S. patent application Ser. No. 08/554,502, filed on Nov. 7, 1995 under the title "Method for Logical Network Design in Multi-Service Networks," and commonly assigned herewith.

The Mitra et al. routing method will now be briefly discussed with reference to FIG. 2.

The objective of the routing method is to find the rates of traffic offered to each route between a source-destination pair that will optimize the performance of the network. The performance of the network can be characterized in various ways. In an exemplary analysis, it is characterized by the long-term network revenue W. W is determined by the revenue earned per carried call per unit time $e_{sr}$, the traffic intensity (also referred to as "traffic rate") $\rho_{sr}$, and the loss probability $L_{sr}$. The subscript s takes on a different value for each service type, and signifies that each service type has its own peculiar set of values for these parameters. (In the fields of network design and management, the traffic characteristics and measures of the quality of service are sometimes said to be determined by the pertinent "application," and the term "service" is used somewhat more narrowly. Here, we use the term "service" in its general sense, in which it is synonymous with "application.")

The subscript r takes on a different value for each route in the set of permissible routes between a given source and destination, and signifies that even within a given service type, each route has its own peculiar set of values. The traffic intensity is defined as the mean arrival rate of calls offered to the given route multiplied by the mean holding period of a call. (For modeling purposes, we have assumed that call arrivals have a Poisson distribution.) The loss probability is defined as that fraction of calls that are blocked. Blocking occurs if any link in the route refuses the call (due to insufficient resources to carry the call on that link).

The loss probabilities have a complicated dependence on the offered traffic rates. Specifically, small changes in traffic loading in one portion of the network can have repercussions over a larger portion of the network. Because of this, an iterative method must be used to approach the optimal set of offered traffic rates by successive approximations. Mitra et al. takes an approach based on well-known techniques of optimization, such as the method of steepest ascent. According to this method, knowledge of the sensitivity of W to each of the various parameters $\rho_{sr}$ is used to formulate the step from each current approximation to the next approximation. These sensitivities are referred to as the "network sensitivities."

For this method to be applied, predefinitions are first supplied (blocks 30, 35, 40) for the service classes s, the effective bandwidth $d_{sl}$ of each service class on each link, the demand $\bar{\rho}_{s\sigma}$ for each service class between each source-destination pair $\sigma$, the route sets R(s,$\sigma$) for respective streams (s,$\sigma$), and the capacity allocations $C_l$ on the respective links.

An initial set of values for the $\rho_{sr}$ is provided (block 45).

Then, the route and bandwidth-allocation data are used to determine the loss probabilities and the network sensitivities (block 50).

Then, the values of the $\rho_{sr}$ are incremented according, e.g., to the method of steepest ascent to give an improved value of W (block 55).

Then, in an exemplary method of measuring the approach to a local optimum, a test for convergence (block 60) is carried out by comparing the current and previous values of W. If the change in W is small enough, the procedure is declared to have converged, and the current values of W and the parameters $\rho_{sr}$ are output as the optimum values. Otherwise, the procedure is iterated, using the current values of $\rho_{sr}$ as input.

An arriving call of a given stream may be offered to any route in the set of permissible routes for that stream. These offers may be approximately distributed over the routes of the route set according to respective, predetermined probability values. That is, for each route, the probability that a randomly selected call will be offered to that route has a predetermined value. The optimized values of the parameters $\rho_{sr}$ are used to determine these probabilities.

The output from the procedure of Mitra et al. also includes the loss probability $B_{sl}$ of each service type s on each link l. Procedures are available to derive, from this information, a measure of the desired bandwidth utilization for each link of each service route, and from that to make nominal allocations of bandwidth for each stream to each link of each service route.

It is becoming increasingly important for network operators to offer their customers guaranteed quality of service (e.g., through service-level agreements), particularly for services of different types (and thus, different data rates). One very attractive approach to this problem is to organize the network into virtual private networks (VPNs). Sufficient bandwidth is allocated to the various VPNs, on the links that they occupy, to provide the quality of service that has been negotiated. To maximize his revenues, the network operator will need to make the bandwidth allocations in such a way that when the traffic of all of the customers is optimally routed over their respective VPNs, a weighted aggregate measure of bandwidth carried over the network, such as the network revenue W, is maximized.

The problem that this poses contains complexities that have not been addressed adequately, if at all, in earlier work. That is, the partitioning of links among different VPNs forces a coupling between the problem of optimal routing within a VPN, and the problem of optimal bandwidth allocation to each VPN.

As we have discussed, the method of Mitra et al. is advantageously applied to the routing problem in isolated VPNs. However, this method alone does not provide a solution to the larger issues of network design when network resources are allocated among multiple VPNs.

SUMMARY OF THE INVENTION

We have invented a method for solving the joint problem of optimal routing and optimal bandwidth allocation in a network that supports plural subnetworks and plural communication services. In a broad aspect, our invention involves, for each source-destination pair communicating via a given subnetwork and a given class of service, determining a traffic rate to be offered to each of a set of permissible routes between that source and that destination, in the given subnetwork and service class. Our invention further involves allocating a respective bandwidth to each link of each subnetwork. Significantly, the determinations of traffic rate to be offered, and the allocations of bandwidth to respective links of subnetworks, are performed in a mutually responsive manner.

DETAILED DESCRIPTION

I. The Optimal Routing Problem According to Mitra et al.

As an aide to the understanding of the present invention, it is helpful to first review the broad aspects of the procedure described in Mitra et al., cited above. The problem addressed by the procedure of Mitra et al. is here referred to as the Optimum Routing Problem.

As noted above in reference to block 50 of FIG. 2, one step in the (iterative) procedure is to determine the loss probabilities $L_{sr}$ and the network sensitivities $\partial W/\partial \rho_{sr}$, which are best understood as the respective derivatives of network revenue with respect to the offered load of service type s on route r.

Figure 2:
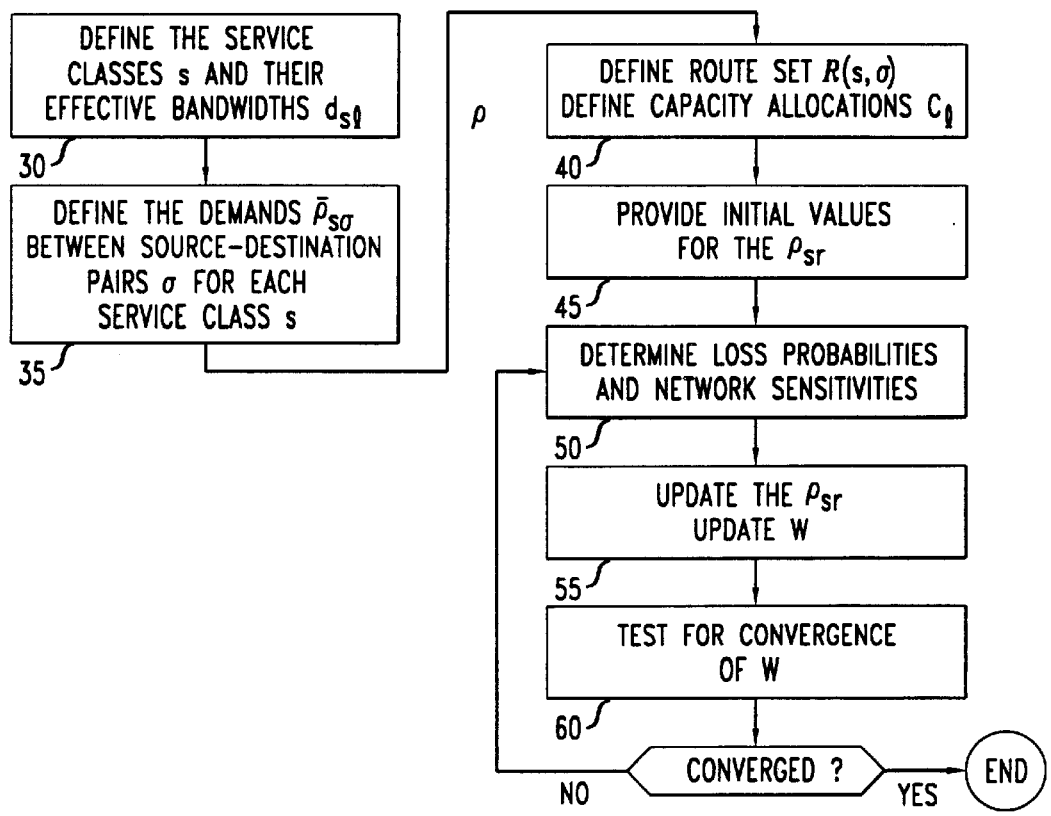
FIG. 2 is a flow chart of the method of Mitra et al. for solving the optimal routing problem in a multiservice network.
Figure 3:
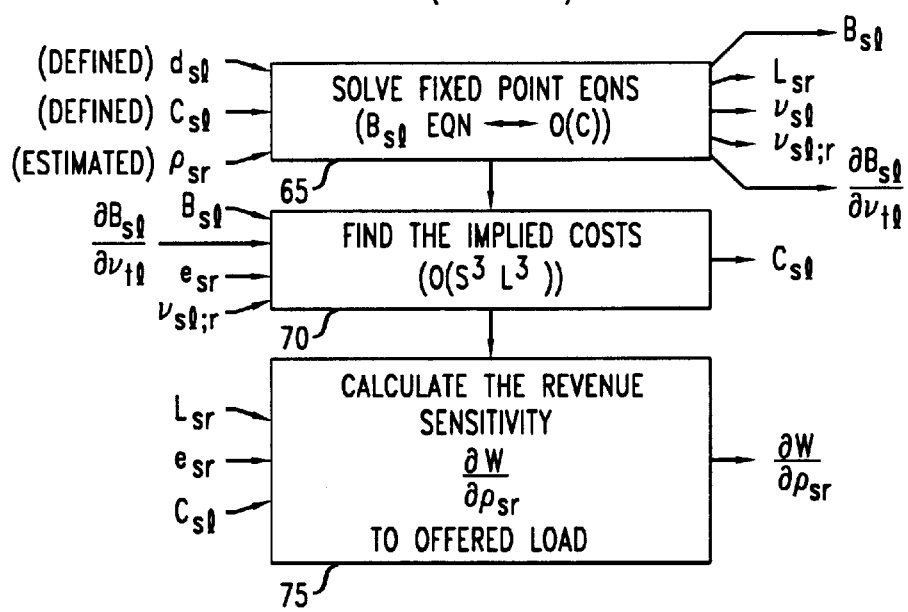
FIG. 3 is an expanded detail of the flowchart of FIG. 2, showing further steps involved in determining loss probabilities and network sensitivities.

The step represented in FIG. 2 as block 50 is shown in FIG. 3 as made up of three smaller steps, shown respectively as blocks 65, 70, and 75. Block 65 takes as input the predefined effective bandwidths $d_{sl}$, the predefined link capacities $C_l$, and the current estimate of the offered loads $\rho_{sr}$. The procedure to be carried out in block 65 involves iteratively finding a self-consistent solution of two systems of coupled equations (for each service class s and link l). These equations, referred to as fixed-point equations, are discussed in greater detail below. One system of equations is for the link loss probabilities $B_{sl}$, discussed below. If the calculation is carried out using exact techniques, the calculation of $B_{sl}$ has complexity O(C), where C characterizes the link capacities. (As explained below, the use of asymptotic techniques can reduce this complexity to O(1).)

The quantities that may be calculated as a result of block 65 include the link loss probability $B_{sl}$ of calls of service s on link l, the load $v_{sl;r}$ of service s added to link l by route r after independent thinning (i.e., dropping of calls) by all other links in the given route, and the derivative of the link loss probability with respect to each of the total thinned loads. Together with the predefined network revenue $e_{sr}$ earned per carried call per unit time, these quantities are input to block 70 of the figure. Also output by block 65 is the route loss probability $L_{sr}$, which is the equilibrium probability that after admission to the network, a call of service class s will be dropped by route r. (A route will drop a call if any of its links refuses the call.)

In block 70, a set of parameters $c_{sl}$ is calculated for each service class, where l ranges over the values l=1, 2, . . . , L, and L is the total number of links in the network. These parameters, referred to as implied costs, reflect the effective loss of revenue occasioned when the carrying of calls of a given service class on a given link reduces the remaining capacity and thus leads to an incremental increase in the blocking of future offered calls. The complexity of this calculation, using exact techniques, is $O(S^3L^3)$.

The network sensitivities are readily derived from the route loss probabilities, the earnings parameters, and the implied costs, as indicated in box 75 of the figure.

Figure 4:
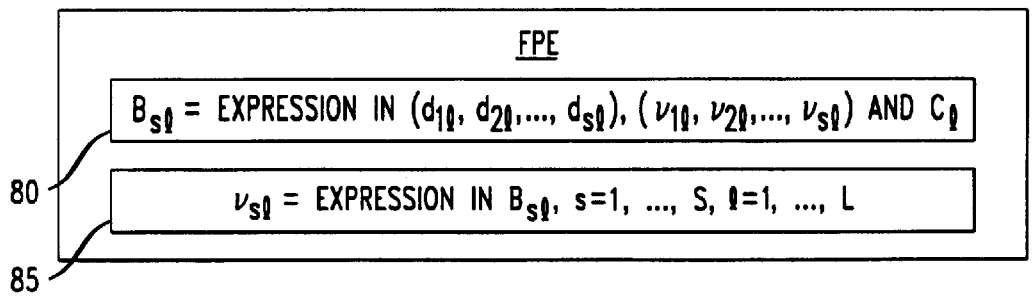
FIG. 4 is an expanded detail of FIG. 3, illustrating fixed point equations.

Turning now to FIG. 4, the two fixed point equations are represented there by blocks 80 and 85, respectively. In block 80, each of the link loss probabilities is expressed in terms of the corresponding link capacity and, for each service class s, s=1, 2, . . . , S (S is the total number of service classes), the corresponding total thinned link load and link bandwidth. In block 85, each total thinned link load is expressed in terms of the respective link loss probabilities for all links and all service classes. As noted, an iterative technique is used to solve these two systems of coupled equations self-consistently.

In many cases of practical importance, the link capacities may become so great that it is not economically or numerically feasible to solve the fixed point equations and find the implied costs by exact techniques. In such cases, as described in Mitra et al., an asymptotic approximation referred to as the Uniform Asymptotic Approximation (UAA) may be used to reduce the complexity of the calculations. In fact, small links may be treated by exact techniques while, concurrently, larger links are treated by the UAA. We refer to such an approach as a "hybrid" approach.

Figure 5:
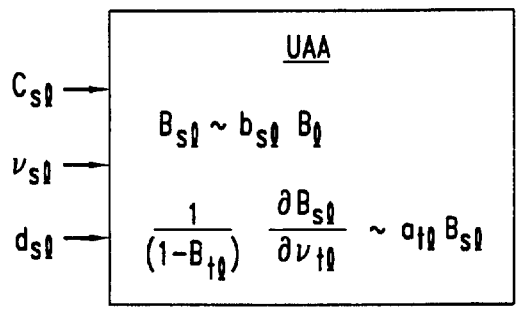
FIG. 5 is an illustration of the Uniform Asymptotic Approximation (UAA), which may be used in connection with the procedures of FIG. 3.

FIG. 5 provides a statement of the UAA for the link loss probability $B_{sl}$, expressed in terms of the link capacities, total thinned link loads, and link bandwidths. The functions $b_{sl}$ and $B_l$ referred to in the figure are defined in Mitra et al. and need not be described here in detail, except to note that $B_l$ is independent of service class s. This is important for reducing the complexity of the calculations of loss and implied cost, as discussed below.

The second expression that appears in FIG. 5 is a consequence of the UAA. It is a starting point for obtaining the implied costs. It is also important for reducing the complexity of the calculations of loss and implied cost. The symbols s and t are both indices of service class. The function anl is defined in Mitra et al., and need not be discussed in detail here.

It should be noted in this regard that although the UAA has been found useful in connection with the Optimum Routing Problem as addressed by Mitra et al., we have found it preferable to use a different asymptotic approximation when solving the Optimum Routing Problem in the context of the present invention. Our preferred approximation is referred to as the Refined Uniform Asymptotic Approximation (RUAA). The RUAA is preferable because it is more accurate for calculating implied costs and sensitivities to link loss probabilities. We provide a detailed discussion of the RUAA below, after turning to the features of the present invention.

Figure 6:
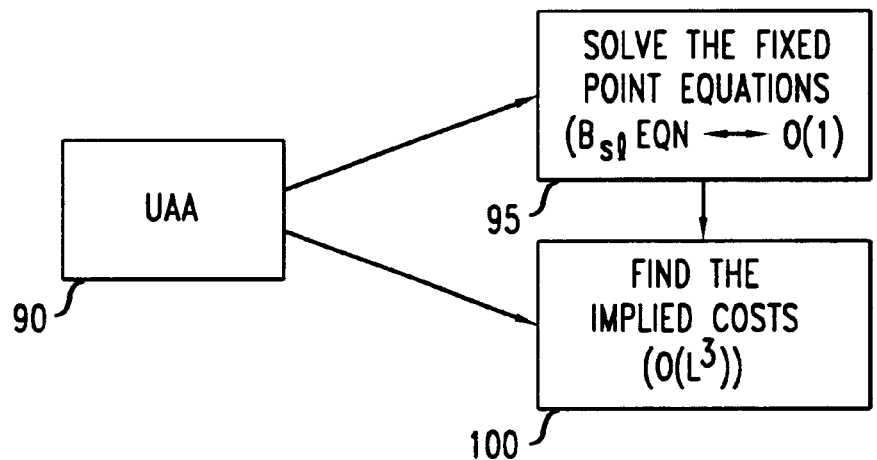
FIG. 6 is a schematic diagram illustrating the interaction between the UAA and the procedures of FIG. 3.

As indicated in FIG. 6, when the UAA (box 90) is introduced into the calculations, economy is achieved in solving the fixed-point equations (box 95) because the complexity of calculating the link loss probabilities can be reduced to O(1) (i.e., it remains bounded as C increases without bound), and the complexity of finding the implied costs (box 100) can be reduced to $O(L^3)$. Thus, the complexity of finding the implied costs is made independent of the number of service classes. This is especially significant for large multirate networks, that serve customers with diverse needs and thus carry traffic in many different service classes.

II. The Joint Problem of Optimal Routing and Resource Allocation—Introduction

Figure 1:
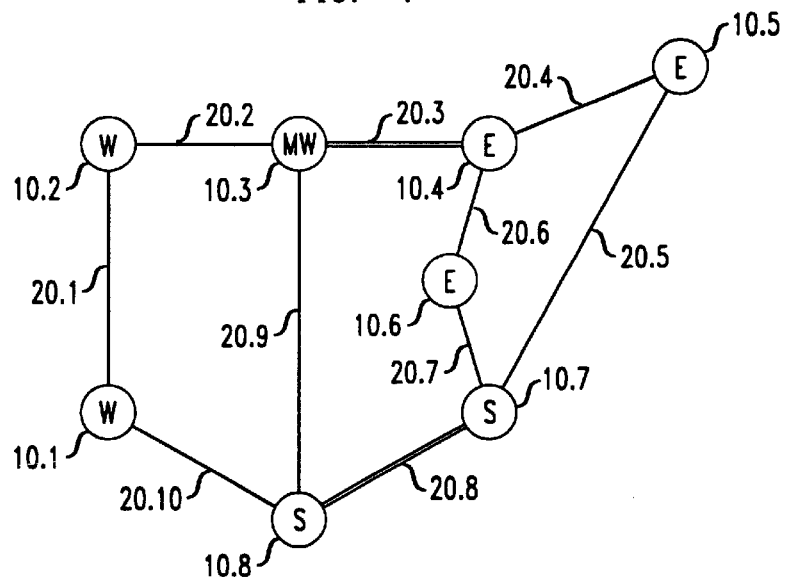
FIG. 1 is a schematic diagram of an illustrative communication network.

We now turn to the features of the present invention, in an exemplary embodiment. The physical infrastructure network supports a plurality of subnetworks. We will often use the term Virtual Private Network (VPN) to refer to these subnetworks. For example, we may suppose that four customers are served by the network of FIG. 1: East Corporation, Midwest Corporation, West Corporation, and South Corporation. Each of these has its own VPN, but links of the underlying network are shared among the various VPNs. Each corporation has its own patterns of usage of these various links. For example, within each VPN, traffic might be heavier between nodes that correspond to corporate main offices, than between other pairs of nodes. For purposes of the illustrative embodiment that we describe below, West will have a main office at nodes 10.1 and 10.2 of FIG. 1, Midwest will have a main office at node 10.3, East at nodes 10.4, 10.5, and 10.6, and South at nodes 10.7 and 10.8. (For the same illustrative purposes, any node that is not a main office of a corporation will be a branch office.)

There are $\bar{\Omega}$ distinct VPNs, indexed in the following discussion by the symbol $\Omega$. A bandwidth capacity $C_l^{(\Omega)}$ is allocated to each link l of each VPN $\Omega$. The objective of the inventive techniques is to design the VPNs (i.e., to estimate the values of $C_l^{(\Omega)}$) such that, when the traffic of each customer is optimally routed over its VPN, a weighted aggregate measure of carried bandwidth over the network is maximized. In the following discussion, this weighted aggregate measure is referred to as network revenue. It is important to note that each of the VPNs will typically be supporting traffic in plural classes of service, each indexed herein by the symbol s.

Symbols used above in the description of the Optimal Routing Problem according to Mitra et al. will also be used in the following discussion. However, those quantities that are peculiar to a particular VPN will be superscripted with the VPN index, as in the case of link capacities mentioned above.

The decision variables (whose values are optimized in order to achieve the objective stated above) are the link capacities $C_l^{(\Omega)}$ and the traffic intensity $\rho_{sr}^{(\Omega)}$ of each stream and VPN that is admitted to the network and offered to a route r belonging to the set $\mathbb{R}_{(s,\sigma)}^{(\omega)}$ of permissible routes for that stream. (The various routes are indexed by the symbol r.)

We assume in the following discussion that there are a total of S service classes, with each call of class s requiring a bandwidth $d_{sl}$ on link l.

Although we believe that our inventive technique will have broad applications in practical networks, it should be noted that the embodiment to be described here was formulated with reference to a model network having certain idealized properties. As noted above, we have assumed that a packetized network can be modeled as a circuit-switched loss network, and that all considerations relating to buffering can be subsumed into the effective bandwidth. Moreover, we assume that call arrivals for each stream are Poisson distributed, with a mean rate $\Lambda_{s\sigma}^{(\Omega)}$. Admission of each arriving call of stream $(s, \sigma)^{(\Omega)}$, is assumed to be controlled by an independent Bernoulli trial. Thus, the outcome of such a trial determines whether the call is offered to VPN $\Omega$, and if so, to which route in the route set $\mathbb{R}_{(s,\sigma)}^{(\omega)}$ it is offered. If the call is accepted, the bandwidth on each link is assumed to be simultaneously held for the duration of the call. An arriving call offered to a given route may still be blocked if any link on the route has insufficient bandwidth. The holding periods of calls in stream $(s,\sigma)^{(\Omega)}$ are assumed to be independent of earlier arrival and holding times, and to have a mean value $1/\mu_{s\sigma}^{(\Omega)}$.

The call arrivals of each stream $(s, \sigma)^{(\Omega)}$, for each route r in the permissible route set $\mathbb{R}_{(s,\sigma)}^{(\omega)}$ of that stream, are also assumed to be Poisson distributed, with a mean call-arrival rate $\lambda_{sr}^{(\Omega)}$. The sum of the mean route call-arrival rates over the entire route set can be no greater than the mean call-arrival rate $\Lambda_{s\sigma}^{(\Omega)}$ for the entire stream. The service-route traffic intensity $\rho_{sr}^{(\Omega)}$ is defined as $\lambda_{sr}^{(\Omega)}/\mu_{s\sigma}^{(\Omega)}$, and the stream traffic intensity $\bar{\rho}_{s\sigma}^{(\Omega)}$ is defined as $\Lambda_{s\sigma}^{(\Omega)}/\mu_{s\sigma}^{(\Omega)}$.

We define an admission control parameter $\rho_{s\sigma}^{(\Omega)}$ as $(1/\Lambda_{s\sigma}^{(\Omega)})$ times the sum, over the entire route set, of the mean route call-arrival rates $\lambda^{sr(\Omega)}$. This quantity expresses the Bernoulli probability that a given incoming call of the pertinent stream will be offered to the network. Similarly, the probability that a given call of service types will be offered to a route r is given by $\lambda_{sr}^{(\Omega)}/\Lambda_{s\sigma}^{(\Omega)}$. These admission probabilities and routing probabilities are obtained from the results of the inventive procedure.

III. The Joint Problem of Optimal Routing and Resource Allocation—Overview

The total network revenue W is the sum, over all of the VPNs, of the respective subnetwork revenues $W^{(\Omega)}$. The subnetwork revenue is evaluated from the service-route traffic intensities $\rho_{sr}^{(\Omega)}$, the equilibrium probability $L_{sr}^{(\Omega)}$ of loss on each service route of a call after admission to the network, and the service-route earnings parameter $e_{sr}^{(\Omega)}$.

The carried load of a given service route is given by $\rho_{sr}^{(\Omega)}(1-L_{sr}^{(\Omega)})$. The product of this expression times the pertinent earnings parameter gives the long-run average revenue for the service route. The long-run average revenue for the subnetwork is obtained by summing this expression over all streams (s, σ) in the subnetwork, and over all routes in the route set for each stream.

The objective of the joint problem addressed by our invention is to find the link capacities $c_l^{(\Omega)}$ and the service-route traffic intensities $\rho_{sr}^{(\Omega)}$ that maximize the total network revenue, subject to certain constraints. One constraint is that no service-route traffic intensity may have a negative value. A second constraint is that for all VPNs and all streams, the sum of the service-route traffic intensities over the pertinent route set must not exceed the corresponding stream traffic intensity $\bar{\rho}_{so}^{(\Omega)}$. A third constraint is that the total capacity of each link must be perfectly allocated (i.e., neither under- nor over-allocated) among the VPNs. A fourth constraint is that no subnetwork link capacity $C_l^{(\Omega)}$ may have a negative value.

In at least some cases, it may be desirable to impose further constraints in order to assure a promised quality of service for each of some, or all, of the subnetworks. One such approach is to constrain each of the affected subnetwork revenues $W^{(\Omega)}$ so that it cannot fall below a specified value.

Figure 7:
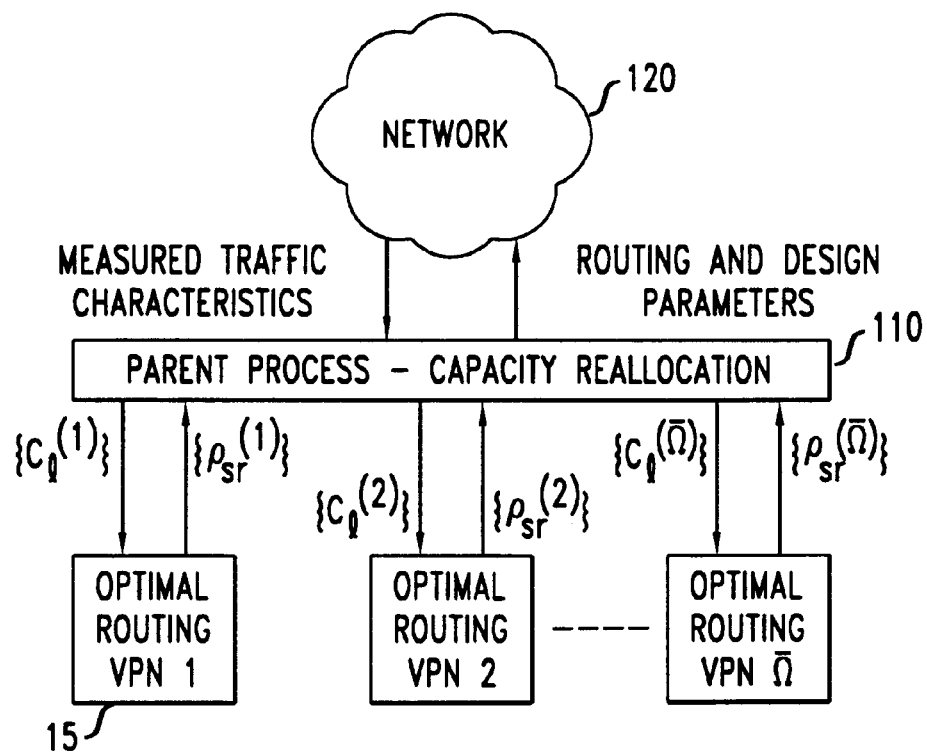
FIG. 7 is a high-level flow chart of a process for solving the joint problem of optimal routing and optimal bandwidth allocation according to the invention in certain embodiments.

As shown in FIG. 7, the computational procedures of the present invention are advantageously carried out by an interplay between parent process 110 and child processes 115, of which there is one for each of the VPNs. The parent process includes the process of solving the resource allocation problem, given a set of service-route traffic intensities corresponding to optimal routing for the current set of subnetwork link capacities. Each of the child processes includes the process of solving the optimal routing problem, given the current set of link capacities for its respective subnetwork. The entire procedure proceeds iteratively, with each reallocation of link capacities followed by a new solution of the optimal routing problem for each of the subnetworks. The iterations cease when the total network revenue is found to converge.

All of these computational procedures are readily carried out by a digital computer under the control of an appropriate computer program. Significantly, each of the child processes is carried out (in each iteration) independently of the others. Therefore, the child processes are conveniently and advantageously carried out by a parallel processor.

In practical applications for real-time network management, traffic characteristics are measured in network 120 and provided to parent process 110, exemplarily in the form of traffic matrices. (In practical networks, these measurements are typically performed periodically, exemplarily once per fifteen-minute period.) The entries in the traffic matrix of a given subnetwork are the offered intensities of stream traffic $\bar{\rho}_{so}^{(\Omega)}$, or the equivalent. In an exemplary matrix for a given subnetwork and service class, each source is represented by a respective row and each destination is represented by a respective column.

The pertinent traffic measurements are, e.g., measuring during the preceding time period and extrapolated to the current time period. Alternatively, the pertinent description of traffic characteristics is based, e.g., on historical data.

Figure 8:
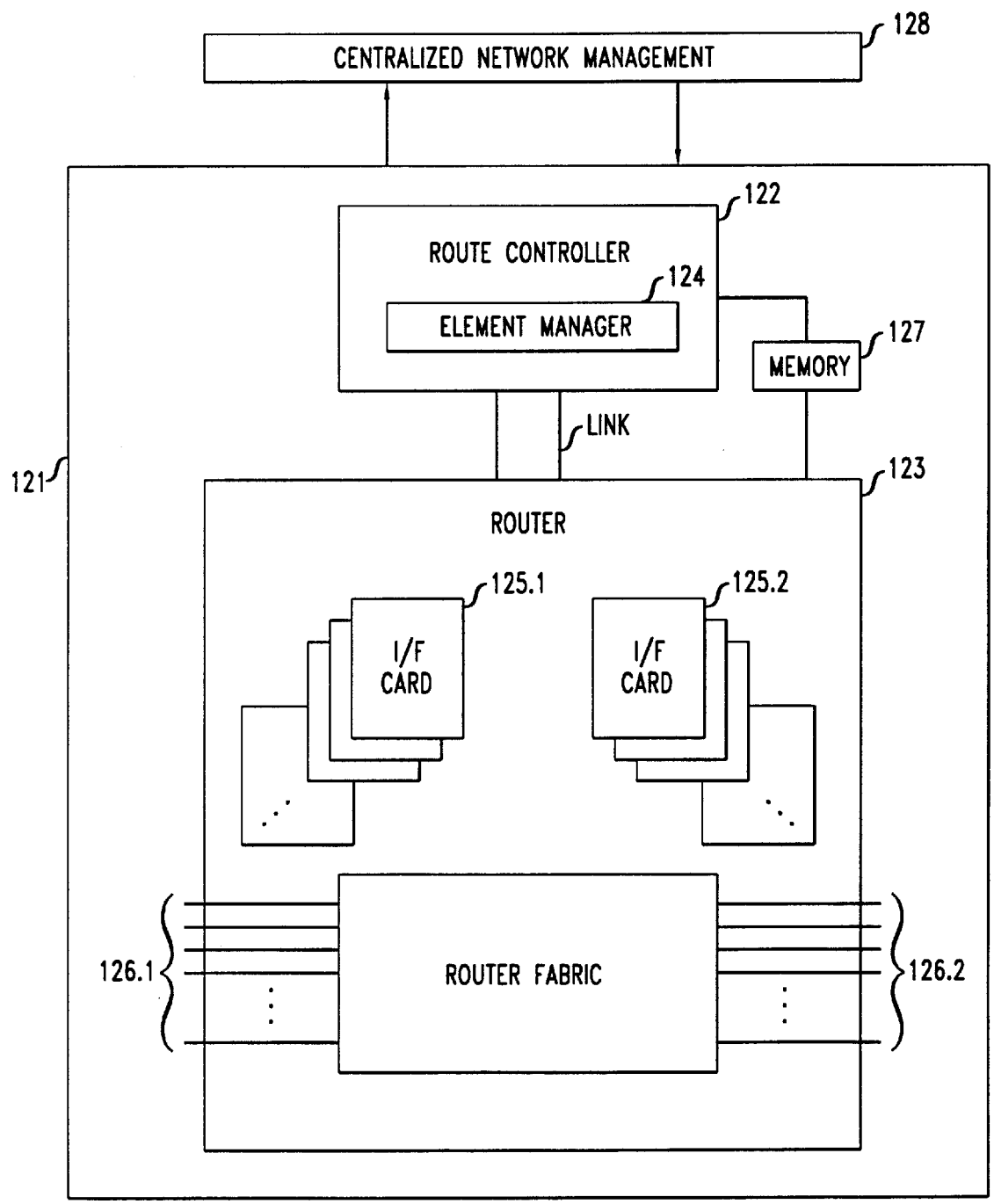
FIG. 8 is a simplified block diagram of a typical network switch useful in the practice of the invention.

The pertinent measurements are typically made by the switches located at the various nodes of the network, and collected by a centralized network-management platform. For example, as shown in FIG. 8, a switch 121 typically includes a central processing unit (CPU) 122, often referred to as a route controller, and a router 123 in mutual communication over a high-speed Ethernet link. Route controller 122 is responsible, inter alia, for selection of routes and, through a software module 124 referred to as an element manager, for element management functions. The router includes a respective interface card 125.1 for each of ingress links 126.1, and a respective interface card 125.2 for each of egress links 126.2. Each of the egress interface cards 125.2 includes a CPU, served by memory 127, in charge of scheduling of packets. Memory 127 may be shared in common with route controller 122. (In some instances, each of the interface cards has its own respective memory.)

Element manager 124 periodically reads the headers on the incoming packets (or cells), and thereby collects information on source-to-destination traffic and utilizations of outgoing links. Significantly, the headers can also include information identifying service class and VPN. A data base (not shown), referred to as the Management Information Base (MIB), typically resides at the element manager and also at centralized network-management platform 128. The relevant data (local or global, as appropriate) are stored in the MIB. Communication between each (local) element manager 124 and the centralized network-management platform 128 is mediated by a protocol referred to as Simple Network Management Protocol (SNMP). In addition to transmitting information to the centralized network-management platform, each element manager also periodically downloads global network traffic information therefrom. This information permits the computational procedures described here to be carried out by, e.g., route controller 122.

The output of the computational procedures, namely the jointly optimized service-route traffic intensities and link capacities, are readily applied by the route controller to update the operating characteristics of the network by, e.g., determining the parameters and weights in schedulers and queuing engines.

For example, each egress link from switch 121 typically has its own scheduler, implemented by the cpu on the corresponding interface card 125.2. Various scheduling methods are available for carrying out the scheduling function. Weighted scheduling, such as weighted round-robin scheduling, is particularly useful for enforcing service-level agreements. A weight may be described as the fraction of the bandwidth to be given to a particular queue. Thus, the weights control the quality of service and resource allocation among VPNs, among services within VPNs, and among source-destination pairs within those service classes. The weights are computed by route controller 122 and downloaded to router 123 for implementation in the respective schedulers.

It should be noted in this regard that the computational procedures of FIG. 7 lead to a complete partitioning of the subnetworks. That is, link capacities are allocated strictly by subnetwork, with no inherent sharing of allocated capacities between any two subnetworks that happen to share the same link. We have found, quite surprisingly, that the cost (in lost capacity) of complete partitioning is relatively low. For example, our experimental simulations (some of which are described below) have shown, in a model network, that about 2% of the call blocking is attributable to the complete partitioning (by comparison with a network design based on complete sharing of network resources between subnetworks). In practical situations, this cost may be amply offset by the benefits of isolating the respective VPNs and protecting them from runaway borrowing of resources by other VPNs. Thus, there is greater assurance that the promised quality of service on each VPN can indeed be provided.

Nevertheless, there may be cases in which, after the complete partitioning has taken place, it is advantageous to permit temporary borrowing of resources between VPNs, according, e.g., to current need on a call-by-call basis. (Such borrowing is exemplarily implemented by setting a scheduling weight known as a trunk reservation parameter.) Various procedures for such borrowing are well known to those skilled in the art. Specific examples are described, e.g., in D. Mitra and I. Ziedins, "Hierarchical Virtual Partitioning: algorithms for virtual private networking," *Proc. IEEE GLOBECOM* 1997, pp. 1784–1791, and also in U.S. patent application Ser. No. 08/649,502, commonly assigned herewith, filed by D. Mitra and E. Ziedins under the title "Method for Sharing Network Resources by Virtual Partitioning." Typically, a control element at a network node applies certain criteria in order to determine whether a requested reallocation may be made from one VPN to another. The criteria may be based, for example, on the affected service class, the current load on the network link (or other physical resource), and the current load on the borrowing VPN. ( It should be noted that the decision to make such a reallocation may involve cooperation between the source switch and one or more transit switches.)

Thus, our invention is not limited to resource allocation and routing procedures having complete partitioning as an ultimate objective. Instead, the scope of our invention is intended to include procedures in which complete partitioning is an intermediate stage, followed by further adaptations.

As discussed above, Mitra et al. describes the use of an approximation referred to as the UAA for determining loss probabilities and implied costs, and we similarly use an approximation referred to as the RUAA in the exemplary embodiment to be described below. Both the UAA and the RUAA are examples of asymptotic techniques based on stochastic models of the network traffic. Those skilled in the art will appreciate that other models are also available, and may be appropriate in certain regimes of network complexity, network capacity, and traffic density.

One such class of models are the deterministic flow models, which treat network traffic, in some sense, as a continuous fluid. Deterministic flow models are much simpler than the stochastic models that we discuss here, but when applied to achieve the objectives described here, they tend to pose relatively large linear programming problems. These models may be especially advantageous for treating large networks, such as router-based networks of 500 nodes or more. Deterministic flow models may be applied to the resource-allocation procedure, or to the routing procedure, or to both.

In fact, various hybrid approaches are possible, and indeed may be advantageous when applied to certain problems. In one hybrid approach, mentioned above, the solver of the optimal routing problem applies a stochastic model, but to estimate the link-loss probabilities and their partial derivatives with respect to offered traffic, it treats small-capacity links by exact techniques, and large-capacity links by asymptotic techniques. In another hybrid approach, solver of the optimum routing problem applies asymptotic techniques, but it uses the UAA during the early iterations and switches to the RUAA for the final stages of convergence to maximal network revenue W. Thus, computational complexity is reduced for most iterations, but convergence is made more accurate in the last few iterations. In approaches hybridized at a higher level, deterministic flow models are used for solving the optimal routing problem, but techniques based on a stochastic model are used to solve the resource allocation problem, or vice versa.

All of these various alternate and hybrid approaches are intended to lie within the scope and spirit of our invention.

A significant simplification of the computational problem is achieved in our exemplary embodiment by linearizing the dependence of subnetwork revenue upon link capacity. This procedure leads to linearized capacity costs $w_l^{(\Omega)}$. That is, $$\frac{\partial W^{(\Omega)}}{\partial C_l^{(\Omega)}} \approx w_l^{(\Omega)}.$$

It is a fortuitous feature of this linearized approach that the resource allocation problem decomposes such that the reallocations to VPNs can be done for each link independently. Moreover, it is possible to provide a closed-form solution to the resulting linear programming problem.

More generally, nonlinear capacity costs could be used in our approach as an alternative to linear costs.

Approaches using nonlinear capacity costs are also intended to lie within the scope and spirit of our invention.

IV. Exemplary Embodiment of the Invention

Figure 9:
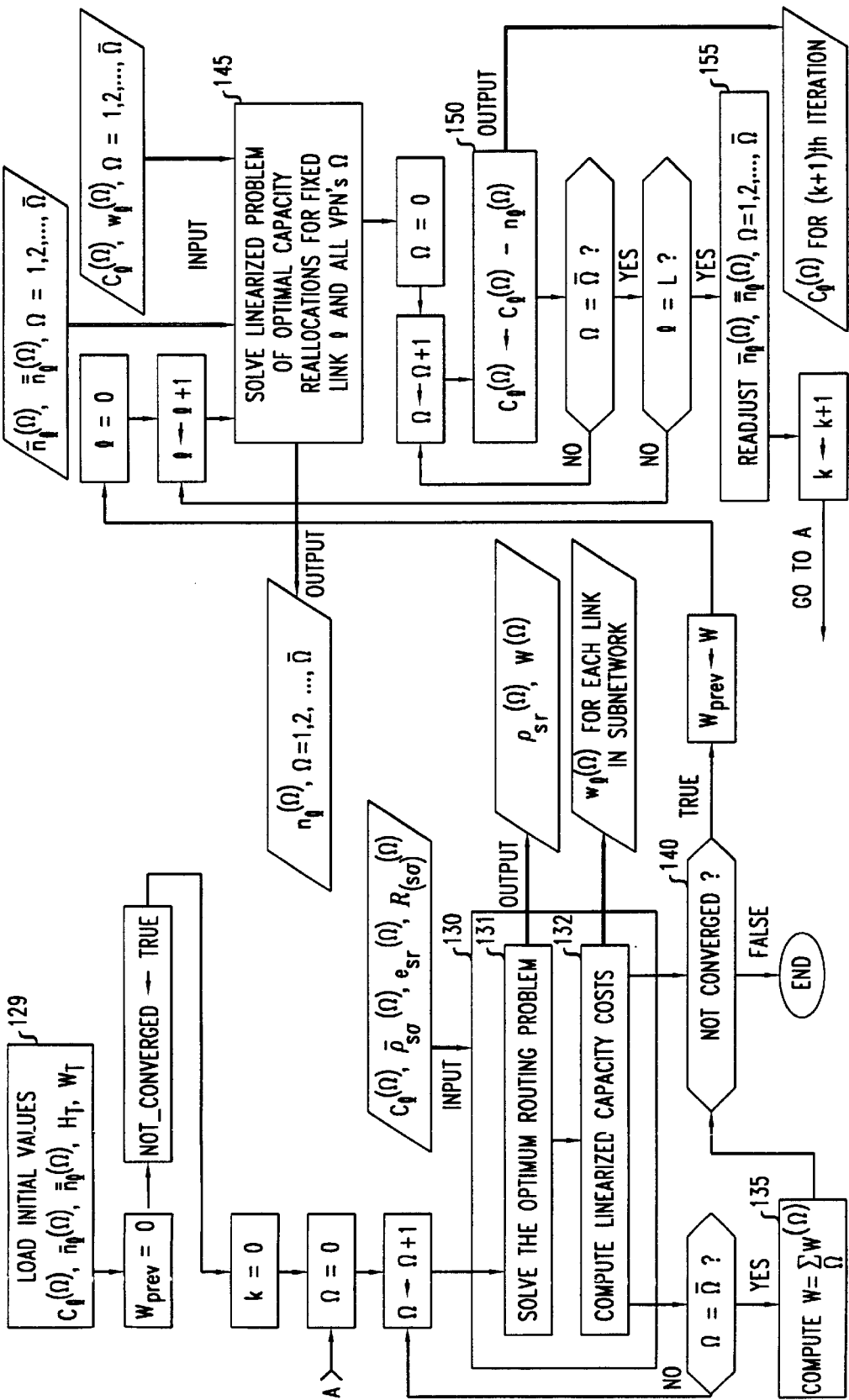
FIG. 9 is a more detailed flow chart of the process of FIG. 7.

Turning now to FIG. 9, an initialization procedure 129 includes loading of initial link capacities $C_l^{(\Omega)}$, as well as initial values of the lower bound $\underline{n}_l^{(\Omega)}$ and upper bound $\overline{n}_l^{(\Omega)}$ on the link-capacity increment $n_l^{(\Omega)}$, and thresholds $H_T$ and $W_T$ that are used for testing the convergence of network revenue W.

As shown in box 130 of the figure, the optimum routing problem is solved (box 131) and the linearized capacity costs are now computed (box 132) for each of the subnetworks $\Omega$, using the current values of the link capacities. It should be noted in this regard that in each iteration of the process represented in box 130, the linearized capacity costs are computed only after the optimum routing solution has converged. For each subnetwork, externally provided information for this process includes the stream demands $\overline{\rho}_{so}^{(\Omega)}$, the earnings parameters $e_{sr}^{(\Omega)}$, and the route sets $\mathbb{R}_{(s,r)}^{(\Omega)}$. For each subnetwork, the output of this process includes the current service-route traffic intensities $\rho_{sr}^{(\Omega)}$, the current subnetwork revenue $W^{(\Omega)}$, and the linearized capacity cost $w_l^{(\Omega)}$ for each link in the subnetwork. After this process has been carried out for each of the subnetworks, the total network revenue is calculated (box 135) and a convergence test is performed (box 140). In our current implementation, two conditions must be satisfied for convergence to be declared (i.e., for the logical variable "NOT_CONVERGED" to be set to FALSE): the fractional increase in W must not exceed $W_T$, and the hypercube defined by all the current $\underline{n}_l^{(\Omega)}$ and $\overline{n}_l^{(\Omega)}$ must be bounded by $H_T$. This hypercube is defined as the set of all L-dimensional real-valued vectors, each of whose components $x_l$ (for each value of l) is no less than $\underline{n}_l^{(\Omega)}$ and no greater than $\overline{n}_l^{(\Omega)}$. This hypercube is bounded by $H_T$ if the maximum over all link indices l of the difference $\overline{n}_l^{(\Omega)} - \underline{n}_l^{(\Omega)}$ is no greater than $H_T$.

In case of convergence, the entire procedure ends. Otherwise, the linearized problem of optimal capacity reallocations 145 is solved for all of the subnetworks, using the current values of the lower bounds $\underline{n}_l^{(\Omega)}$, the upper bounds $\overline{n}_l^{(\Omega)}$, the link capacities $C_l^{(\Omega)}$, and the linearized capacity costs $w_l^{(\Omega)}$ for all of the subnetworks. In our current implementation, and as shown in FIG. 9, a separate iteration of process 145 is performed for each of the respective links. The ability to make this link-by-link decomposition depends, in part, on the constraints that are imposed on the revenue-maximization problem. Currently, our constraints are only that total link capacity is conserved, and that each new capacity allocation must be non-negative and must not individually exceed any link capacity. As noted above, other constraints may be added in order, e.g., to assure a specified minimum quality of service in one or more subnetworks. For example, such a constraint may specify that respective bandwidth carried by one or more subnetworks, in one or more classes of service, may not fall below a specified level (such as a specified fraction of total traffic offered to the pertinent subnetwork in the pertinent class or classes of service). This specified level may apply to total subnetwork bandwidth carried in the pertinent service class or classes, or it may even apply to bandwidth carried between one or more specified source-destination pairs. In such cases, the decomposition will not typically be available. Thus, instead of iterating process 145 for respective links, the process 145 will solve a problem involving all of the links concurrently, such as a linear programming problem, or a non-linear joint optimization problem.

As shown in box 150, process 145 results in new values for each of the link capacities $C_l^{(\Omega)}$, which are incremented by subtracting respective increments $n_l^{(\Omega)}$ (which are bounded, as discussed above).

After process 145 has been executed for all of the links and the link capacities have been updated, the lower bounds $\underline{n}_l^{(\Omega)}$ and the upper bounds $\overline{n}_l^{(\Omega)}$ are also updated (box 155), as discussed in greater detail below. The new values of the link capacities are then handed to process 130 for a further iteration.

Figure 10:
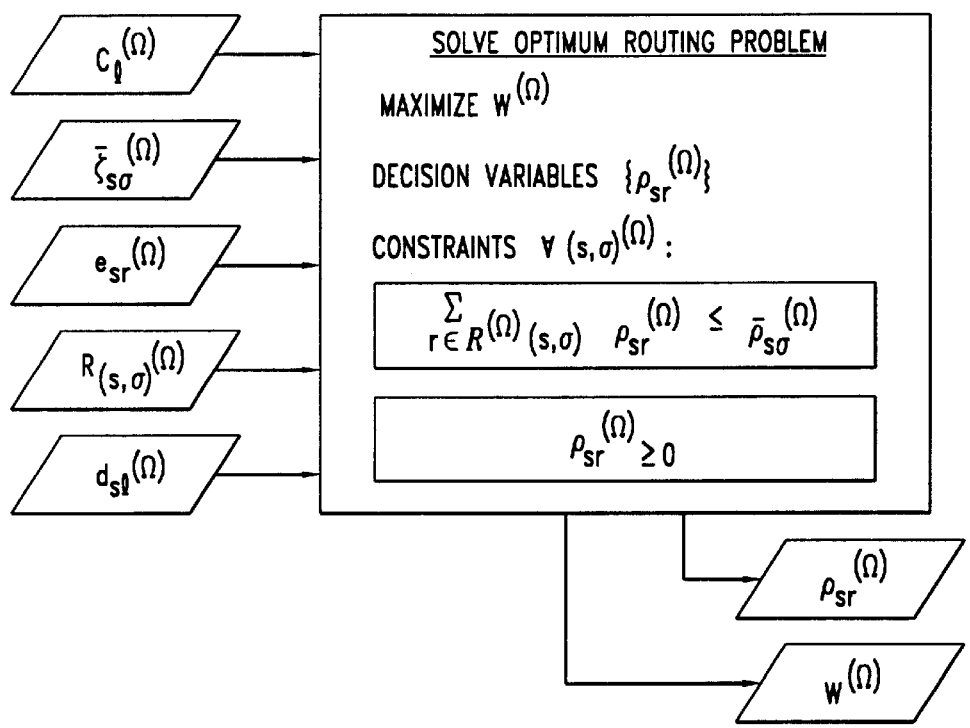
FIG. 10 is an expanded detail of the flow chart of FIG. 9, illustrating the optimum routing problem in the context of a multiservice network that supports plural subnetworks.

FIG. 10 is an expanded version of box 131 of FIG. 9, representing the process for solving the optimum routing problem. As indicated in FIG. 10, a further, externally provided input to this process is the set of effective bandwidths $d_{sl}^{(\Omega)}$ of each service class and link, in the current subnetwork. As shown, the optimal service-route traffic intensities are found for maximizing revenue in the current subnetwork, subject to the constraints that: (i) the total traffic of a given stream offered to all permissible routes must not exceed the total traffic of that stream arriving at the network; and (ii) the traffic intensity $\rho_{sr}^{(\Omega)}$ offered to any given route r must be non-negative.

Figure 11:
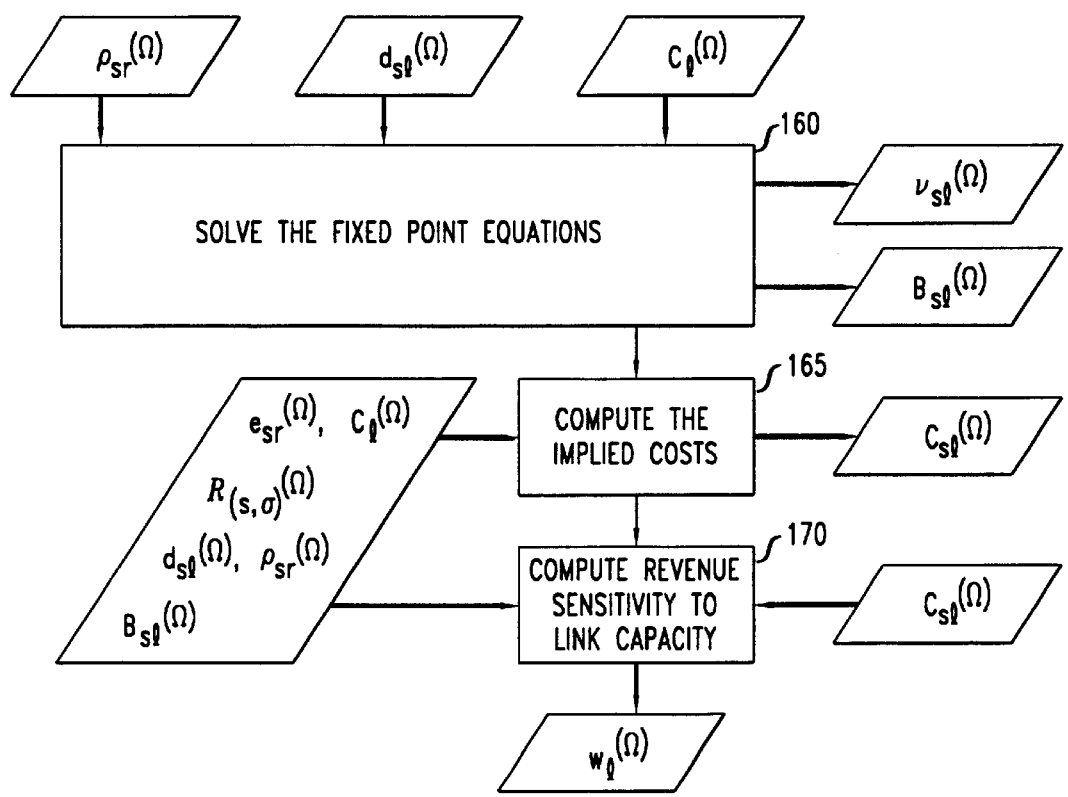
FIG. 11 is an expanded detail of the flow chart of FIG. 10, illustrating a process for computing linearized capacity costs.

FIG. 11 is an expanded version of box 132 of FIG. 9, representing the process for computing the linearized capacity costs $w_l^{(\Omega)}$ (also referred to here as the network sensitivity to link capacity). As shown in FIG. 11, the first stage is to solve the fixed point equations (box 160). Included in the output of this stage are $v_{sl}^{(\Omega)}$, the total thinned load of service s offered to link l (for the current subnetwork $\Omega$). Also included in the output of this stage are the link loss probabilities (also referred to as blocking functions) $B_{sl}^{(\Omega)}$, each expressing the loss probability of the respective service s on the respective link l (for the current subnetwork $\Omega$). The output of this stage is used in the next stage to compute the implied costs (box 165), and the implied costs, in turn, are used to compute the linearized capacity costs (box 170).

Figure 12:
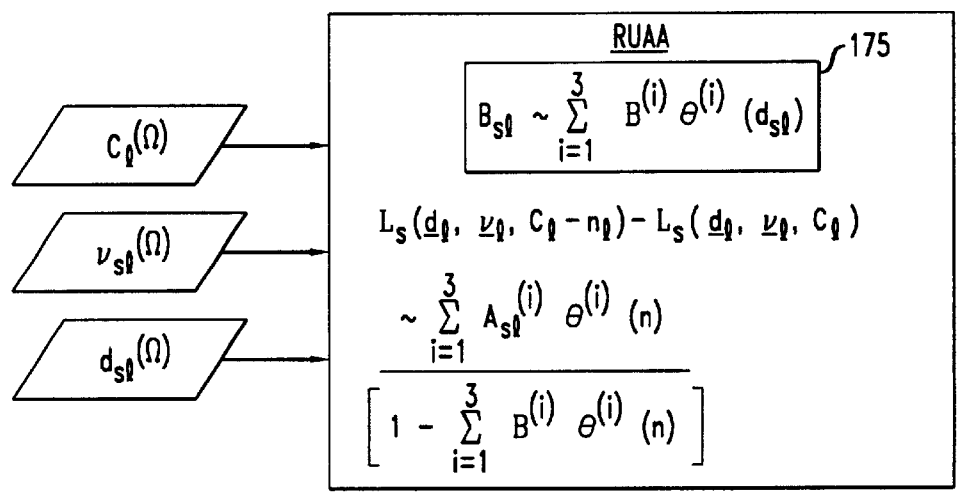
FIG. 12 is an illustration of the Refined Uniform Asymptotic Approximation (RUAA), which may be used in connection with the procedure of FIG. 11.

As noted above, the RUAA is often advantageously used for obtaining the link loss probabilities. FIG. 12 provides, in box 175, a statement of this approximation. The second expression in FIG. 12 is a consequence of the RUAA. It is a starting point for obtaining the implied costs. It is also important for reducing the complexity of the calculations of loss and implied cost. The functions $B^{(i)}$ and $\theta^{(i)}$ and the coefficients $A_{sl}^{(i)}$ are defined below.

The function $\mathbb{L}_s(\underline{d}_l, \underline{v}_l, C_l)$ for the link loss probability is well known to those skilled in the art. Methods for its evaluation are described in J. S. Kaufmann, "Blocking in a shared resource environment," IEEE Trans. Commun., vol. COM-29, pp. 1474–1481 (1981), and in J. W. Roberts, "Teletraffic models for the Telecom 1 integrated services network," in Proc. Int. Teletraffic Congress-10, Session 1.1, paper #2. The symbol $\underline{d}_l$ as an argument of the function $\mathbb{L}_s$ stands for $(d_{1l}, d_{2l}, \ldots, d_{sl})$. The symbol $\underline{v}_l$ as an argument of the function $\mathbb{L}_s$ stands for $(v_{1l}, v_{2l}, \ldots, v_{sl})$.

Figure 13:
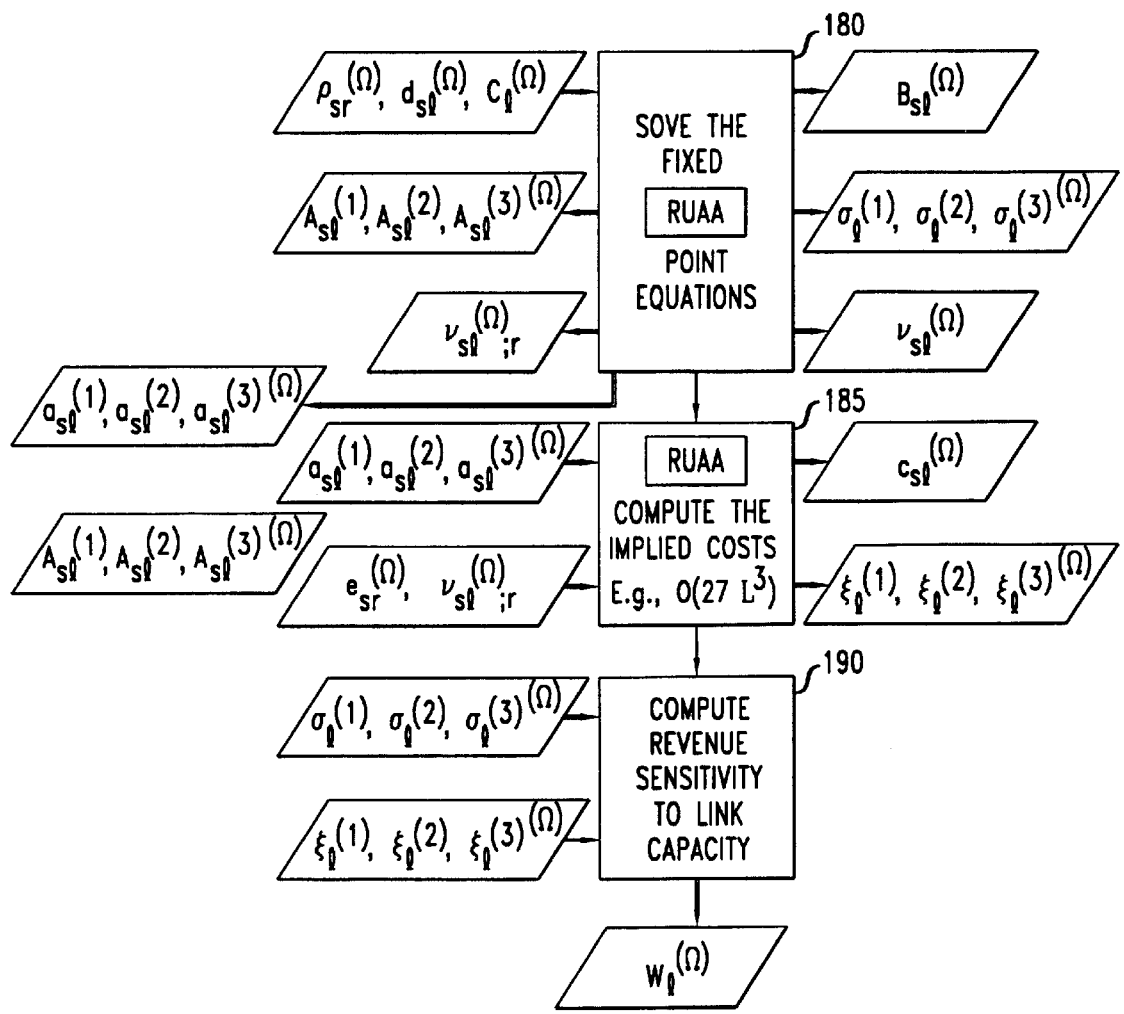
FIG. 13 is a flowchart of the processes of FIG. 11, as modified to incorporate the RUAA.

FIG. 13 shows the same processes as FIG. 11, modified to incorporate the RUAA. As indicated by box 180, the process for solving the fixed point equations now includes, as output, coefficients $A_{sl}^{(i)}$ and $a_{sl}^{(i)}$ (defined below) for the current subnetwork. These coefficients are used in process 185 to compute the implied costs. The output of process 180 also includes for each link and service route (for the current subnetwork) the load $v_{sl;r}^{(\Omega)}$ of service s added to link l after independent thinning by all other links in route r. This quantity is also used for computing the implied costs. The output of process 180 also includes the functions $\sigma_l^{(i)}$ (defined below) for the current subnetwork. These functions are used in process 190 for computing the linearized capacity costs.

As indicated in the figure, the RUAA is incorporated in both process 180 and process 185. Included in the output of process 185 are the functions $\xi_l^{(i)}$ (defined below) for the current subnetwork. These functions are used in process 190 for computing the linearized capacity costs. Significantly, the complexity of process 185 can be made independent of the total number S of service classes when the RUAA is used. Although the actual complexity of this process depends upon the specific mathematical techniques used, a typical complexity for obtaining the implied costs when the RUAA is used is $O(27L^3)$.

Mathematical Details

1. Fixed Point Equations

The VPN index $\Omega$ is suppressed in this section.

The fixed point equations (FPE) for the subnetwork are derived on the basis of the well known assumption of link independence. Each route r carrying traffic of service type s and using link l adds load $v_{sl;r}$ on link l which, by assumption, is Poisson, with a rate which is reduced by independent thinning by all other links in the route. By summing $v_{sl;r}$ over all routes r which use link l we obtain $v_{sl}$, the total thinned load of service s offered to link l. Now let $B_{sl}$ denote the loss probability of service s on link l and let $\underline{d}_l = \{d_{sl}\}_s$ and $\underline{v}_l = \{v_{sl}\}_s$. Then $B_{sl} = \mathbb{L}_s(\underline{d}_l, \underline{v}_l, C_l)$, which may be computed by the Kaufman-Roberts recursion mentioned above, with complexity $O(C_l)$. Alternatively, if $C_l \gg 1$ and $\underline{v}_l = O(C_l)$, an approximation to $B_{sl}$ may be computed by the RUAA, with complexity $O(1)$. In any case, we let $\phi_{sl}$ denote this mapping. The complementary part of the FPE gives the thinned offered load at each link as a function of the link loss probabilities. This mapping is denoted by $\psi$. The complete subnetwork FPE are:

$$B_{sl} = \phi_{sl}(v_l), (s=1,2, \ldots, S; l=1,2, \ldots, L),$$

$$v = \psi(B), \qquad (1)$$

where $$v = \{v_l\} \text{ and } B = \{B_{sl}\}.$$

The numerical technique for solving the FPE is successive approximations, possibly damped. Finally, the loss probability $L_{sr}$ of service s on route r is obtained from the solution of the FPE thus $$L_{sr} = 1 - \prod_{l \in r}(1 - B_{sl}); \quad r \in \mathcal{R}(s, \sigma). \tag{2}$$

2. Network Implied Costs

The VPN index $\Omega$ is suppressed in this section.

One of the roles of the implied costs $\{C_{sl}\}$, as exhibited in the following equations, is in determining the sensitivity of subnetwork revenue to offered loads:

$$\frac{\partial W}{\partial \rho_{sr}} = (1 - L_{sr})\left(e_{sr} - \sum_{l \in r} c_{sl}\right). \tag{3}$$

The above highlights the importance of implied costs for traffic routing, where the decision variables are $\{\rho_{sr}\}$. Here our focus is on capacity costs, where implied costs also feature importantly but, as we shall see, in a different way altogether.

The calculation of $\{C_{sl}\}$ requires the solution of a system of SL linear equations, $$c_{tl} = \sum_{\sigma,s}[\mathbb{L}_s(\underline{d}_l, \underline{v}_l, C_l - d_{tl}) - \mathbb{L}_s(\underline{d}_l, \underline{v}_l, C_l)] \tag{4}$$

$$\sum_{r \in R(s,\sigma): l \in r} v_{sl;r}\left(e_{sr} - \sum_{k \in r - \{l\}} c_{sk}\right),$$

where $\{\underline{v}_l\}$ are obtained from the solution of the FPE (1), and $$v_{sl;r} = \rho_{sr} \prod_{m \in r - \{l\}}(1 - B_{sm}). \tag{5}$$

3. Single Link Asymptotics

The VPN index $\Omega$ is suppressed in this section. Symbols introduced in this section are defined in Table A.

Before proceeding to subnetworks, we focus on the use of the RUAA for a single link, and just in this subsection we suppress the link index l. It is assumed that the link capacity C is large, and that the traffic intensities $\{v_s\}$ are also large, O(C). The RUAA to the loss probability $B_s$ for service s on the link takes the form $$B_s \sim \sum_{i=1}^{3} \mathbb{B}^{(i)} \theta^{(i)}(d_s), \tag{6}$$

where $\mathbb{B}^{(i)}$ i=1,2,3, does not depend on s. In the next two subsections we also need an approximation to the change in the loss probabilities due to a change in the capacity. If n=O(1) is a positive or negative integer, then the RUAA has the form $$\mathbb{L}_s(\underline{d}, \underline{v}, C - n) - \mathbb{L}_s(\underline{d}, \underline{v}, C) \sim \frac{\sum_{i=1}^{3} A_s^{(i)} \theta^{(i)}(n)}{\left[1 - \sum_{i=1}^{3} \mathbb{B}^{(i)} \theta^{(i)}(n)\right]} \tag{7}$$

Now $\theta^{(i)}(n)$ is an analytic function of n, and $\theta^{(i)}(0)=0$, i=1,2,3. Although $\mathbb{R}_{(s,\sigma)}^{(\omega)}(\underline{d}, \underline{v}, C) = \mathbb{L}_s(\underline{d}, \underline{v}, \lfloor C \rfloor)$ if C is not an integer, we use the approximation (7) when n is not an integer. In particular, if we divide equation (7) by n, and let n→0, we obtain the capacity gradient $$\frac{\partial \mathbb{L}_s}{\partial C} \sim -\sum_{i=1}^{3} A_s^{(i)} \sigma^{(i)}, \tag{8}$$

where $$\sigma^{(i)} = \lim_{n \to o} \theta^{(i)}(n)/n.$$

These quantities may be given explicitly in terms of the unique positive $z^*$ which minimizes the strictly convex function $$F(z) = \sum_s v_s(z^{d_s} - 1) - C \log z, \quad (z > 0). \tag{9}$$

The function F(z) as well as $z^*$ are common to both the UAA and the RUAA. The minimizer $z^*$ of (9) is readily calculated by bisection. We give below the expressions for $\sigma^{(i)}$ which are needed later.

$$\sigma^{(1)} = \frac{\log z^*}{(z^* - 1)}, \quad \sigma^{(2)} = -\left[\frac{(z^* \log z^* + 1 - z^*)}{(z^* - 1)^2} + \sigma^{(1)}\right], \tag{10}$$

and $$\sigma^{(3)} = \frac{[2(z^*)^2 \log z^* + 2z^*(1 - z^*) - (z^* - 1)^2]}{(z^* - 1)^3} - 2\sigma^{(2)}. \tag{11}$$

4. RUAA in Implied Costs

The VPN index $\Omega$ is suppressed in this section.

We consider the implication of the RUAA for the FPE (1) and the implied cost equations (4). The RUAA may be used, as previously noted, for the evaluation of the function in $\phi_{sl}$ in (1). Also, from (7), reintroducing the link index l, we have $$\mathbb{L}_s(\underline{d}_l, \underline{v}_l, C_l - d_{tl}) - \mathbb{L}_s(\underline{d}_l, \underline{v}_l, C_l) \sim \sum_{i=1}^{3} A_{sl}^{(i)} a_{tl}^{(i)}, \tag{12}$$

where, from (6), $a_{tl}^{(i)} = \theta_l^{(i)}(d_{tl})/(1 - B_{tl})$. From (4), if the RUAA (12) is applicable for all links of the subnetwork, it follows that the implied costs are given asymptotically by $$c_{tl} \sim \sum_{i=1}^{3} a_{tl}^{(i)} \xi_l^{(i)}, \tag{13}$$

where $$\xi_l^{(i)} = \sum_{\sigma,s} \sum_{r \in R(s,\sigma): l \in r} A_{sl}^{(i)} v_{sl;r}\left(e_{sr} - \sum_{k \in r - \{l\}} \sum_{j=1}^{3} a_{sk}^{(j)} \xi_k^{(j)}\right). \tag{14}$$

Equation (14) is a complete system of equations in $\{\xi_l^{(i)}\}$. The parameters $\{A_{sl}^{(i)}\}$, $\{v_{sl;r}\}$ and $\{a_{sk}^{(j)}\}$ are all obtained from the solution of the FPE (1). The complexity of solving the system of 3L linear equations (14) is $O(27 L^3)$, whereas the complexity of solving the system of SL linear equations (4) directly for the implied costs is $O(S^3 L^3)$. Independence from the number of services S constitutes a major gain if S is large. In any case, the approximation in (12), if applicable for link l, may be used in (4).

5. Revenue Sensitivity to Link Capacity

The VPN index $\Omega$ is suppressed in this section.

We consider the implication of the RUAA for the sensitivity of the subnetwork revenue to the link capacities. With the smooth continuation of $L_s(\underline{d}, \underline{v}, C)$ for non-integer values of C, as previously discussed, we have been able to show that the corresponding gradient of the subnetwork revenue with respect to the capacity of link l is $$\frac{\partial W}{\partial C_l} = -\sum_{\sigma,s}\sum_{r\in R(s,\sigma); l\in r} \frac{\partial L_s}{\partial C_l} v_{sl;r}\left(e_{sr} - \sum_{k\in r-\{l\}} c_{sk}\right). \quad (15)$$

Hence, from equations (8), (13), and (14), we obtain $$\frac{\partial W}{\partial C_l} \sim \sum_{i=1}^{3} \sigma_l^{(i)}\xi_l^{(i)}. \quad (16)$$

In summary, for large link capacities $C_l$ and traffic intensities of the same order, $$\frac{\partial W}{\partial C_l} \sim w_l, \quad (17)$$

where $$w_l \equiv \sum_{i=1}^{3} \sigma_l^{(i)}\xi_l^{(i)}. \quad (18)$$

Here $\sigma_l^{(i)}$, i=1,2,3, are given by (10) and (11), with $z^*$ replaced by $z_l^*$. Also, $\xi_l^{(i)}$ are obtained by solving the system of 3L linear equations in equation (14).

We call the quantities $w_l$ the linearized capacity costs.

6. Mathematical Basis of Algorithm

Taking note of (17) and applying it to subnetwork $\Omega$ which has bandwidth $C_l^{(\Omega)}$ allocated to it on each link l, a linearized extrapolation of the revenue for the subnetwork is $$W^{(\Omega)}(\underline{C}^{(\Omega)} - \underline{n}^{(\Omega)}) - W^{(\Omega)}(\underline{C}^{(\Omega)}) \approx -\sum_{l=1}^{L} w_l^{(\Omega)}n_l^{(\Omega)}. \quad (19)$$

Here $W_l^{(\Omega)}$, l=1,2, . . . , L, are the linearized capacity costs given in (18), and integers $n_l^{(\Omega)}$ are candidates for modifying the current capacity allocations. The latter quantities are required to be O(1) for (19) to apply.

$\underline{C}^{(\Omega)}$ is defined as $(C_l^{(\Omega)}, \ldots, C_L^{(\Omega)})$, and $\underline{n}^{(\Omega)}$ is defined as $(n_l^{(\Omega)}, \ldots, n_L^{(\Omega)})$. Also, $\underline{C}$ is defined as $\{C_l^{(\Omega)}\}$.

Note that because the network revenue is the sum of the subnetwork revenues, $$W(\underline{C} - \underline{n}) - W(\underline{C}) \approx -\sum_{\Omega=1}^{\overline{\Omega}}\sum_{l=1}^{L} w_l^{(\Omega)}n_l^{(\Omega)}. \quad (20)$$

We proceed to select $\underline{n}$ such that $W(\underline{C}-\underline{n})$ is maximized. That is, $$\min \sum_{\Omega=1}^{\overline{\Omega}}\sum_{l=1}^{L} w_l^{(\Omega)}n_l^{(\Omega)} \quad (21)$$

$$\{n_l^{(\Omega)}\}: \sum_{\Omega} n_l^{(\Omega)} = 0, \forall l$$

$$C_l^{(\Omega)} - C_l \le n_l^{(\Omega)} \le C_l^{(\Omega)}, \forall l$$

The second constraint merely reflects the requirements that the new capacity allocations are nonnegative and cannot individually exceed any link capacity.

There are two steps involved. The first, which is entirely intuitive given the linear structure of the cost function, and the separability of the constraints by links, establishes that (21) decomposes into L problems, one for each link. That is, with $$\Delta w_l \equiv \sum_{\Omega=1}^{\overline{\Omega}} w_l^{(\Omega)}n_l^{(\Omega)} (l=1, 2, \ldots, L) \quad (22)$$

the problem indexed by l(l=1,2, . . . , L) is $$\min \Delta w_l \quad (23)$$

$$\{n_l^{(\Omega)}\}: \sum_{\Omega} n_l^{(\Omega)} = 0$$

$$\underline{\overline{n}}_l^{(\Omega)} \le n_l^{(\Omega)} \le \overline{\overline{n}}_l^{(\Omega)}$$

In (23) the second constraint in (21) has been tightened to additionally ensure that the decision variables are not so large that the approximation in (19) becomes invalid. This is done as follows:

$$\overline{\overline{n}}_l^{(\Omega)} = \lfloor \min(C_l^{(\Omega)}, (\text{const})\sqrt{C_l^{(\Omega)}}) \rfloor \quad (24)$$

$$\underline{\overline{n}}_l^{(\Omega)} = \lceil \max(C_l^{(\Omega)} - C_l, -(\text{const})\sqrt{C_l^{(\Omega)}}) \rceil, \quad (25)$$

where a reasonable value of the constant (const) $\approx 0.5$. It is important to ensure that the above bounds are integers so that in the step to be described below the optimal solution, and thus the new capacity allocations, are also integral. Note that $$\underline{\overline{n}}_l^{(\Omega)} \le 0 \le \overline{\overline{n}}_l^{(\Omega)} \quad (26)$$

in cases where $C_l^{(\Omega)} > 0$.

We now proceed to examine the linear programming problem in (23) and give an explicit solution. Just here the subscript l is redundant and to keep the notation simple it is suppressed. Also assume without loss of generality that $$w^{(1)} \le w^{(2)} \le \ldots \le w^{(\overline{\Omega})}, \quad (27)$$

i.e., subnetwork 1 is "cheapest", subnetwork $\overline{\Omega}$ "most expensive", and so on. Hence, the objective function decreases whenever we reduce $n^{(\Omega_2)}$ and increase $n^{(\Omega_1)}$ by an identical amount, provided $\Omega_1 < \Omega_2$. Hence, the solution to (23) consists of maximizing $n^{(i)}$ with small values of i and minimizing $n^{(i)}$ with large values of i in a manner that the global constraint $\Sigma n^{(\Omega)} = 0$ is satisfied.

A little thought shows that on account of (26) and (27), there exists a unique subnetwork index I such that $$\overline{\overline{n}}^{(1)} + \overline{\overline{n}}^{(2)} + \ldots + \overline{\overline{n}}^{(I-1)} + \overline{\overline{n}}^{(I)} + \overline{\overline{n}}^{(I+1)} + \ldots + \overline{\overline{n}}^{(\overline{\Omega})}) \quad (28)$$

$$\le 0 < \overline{\overline{n}}^{(1)} + \ldots + \overline{\overline{n}}^{(I-1)} + \overline{\overline{n}}^{(I)} + \overline{\overline{n}}^{(I+1)} + \ldots + \overline{\overline{n}}^{(\overline{\Omega})}). \quad (29)$$

Hence there exists $n^{(I)}$, such that $\underline{\overline{n}}^{(I)} \le n^{(I)} < \overline{\overline{n}}^{(I)}$, and $$\overline{\overline{n}}^{(1)} + \overline{\overline{n}}^{(2)} + \ldots + \overline{\overline{n}}^{(I-1)} + n^{(I)} + \overline{n}^{(I+1)} + \ldots + \overline{n}^{(\Omega)} = 0 \quad (30)$$

Moreover, if all $\overline{n}^{(\Omega)}$ and $\overline{\overline{n}}^{(\Omega)}$ are integral, then so is $n^{(I)}$. Therefore, if $n^{(I)}$, $\overline{n}^{(I)} \leq n^{(I)} < \overline{\overline{n}}^{(I)}$, is the unique solution to (30), then a solution to the linear program in (23) is $$n^{(\Omega)} = \overline{\overline{n}}^{(\Omega)} (\Omega = 1, 2, \ldots, I-1) \quad (31)$$
$$= n^{(I)} (\Omega = I)$$
$$= \overline{n}^{(\Omega)} (\Omega = I+1, I+2, \ldots, \Omega).$$

TABLE A $$\mathcal{B} = \frac{e^{F(z^*)}}{M\sqrt{2\pi V}}$$

$$F(z) = \sum_{s=1}^{S} v_s(z^{d_s} - 1) - C\log z$$

$$V = \sum_{s=1}^{S} v_s d_s^2 (z^*)^{d_s}$$

$$M = \frac{1}{2}\text{Erfc}\left[\text{sgn}(1-z^*)\sqrt{-F(z^*)}\right] + \frac{Ke^{F(z^*)}}{\sqrt{2\pi V}}$$

$$K = \frac{1}{(1-z^*)} - \frac{\sqrt{V}\,\text{sgn}(1-z^*)}{\sqrt{-2F(z^*)}}, z^* \neq 1$$

$$K = \frac{1}{2} + \frac{1}{6V}\sum_{s=1}^{S} v_s d_s^3, z^* = 1$$

$$T = \sum_{s=1}^{S} v_s d_s^2 (d_s - 3)(z^*)^{d_s}$$

$$Y = \sum_{s=1}^{S} v_s d_s^2 (d_s^2 - 6d_s + 11)(z^*)^{d_s}$$

$$\mathcal{B}^{(1)} = \mathcal{B}\left\{1 + \frac{1}{V}\left[\frac{1}{8}\left(\frac{Y}{V} - \frac{5T^2}{3V^2}\right) + \mathcal{B}E\right]\right\}$$

$$\mathcal{B}^{(2)} = \frac{\mathcal{B}T}{2V^2}$$

$$\mathcal{B}^{(3)} = -\frac{\mathcal{B}}{2V}$$

$$\theta^{(1)}(n) = \sum_{j=0}^{n-1} (z^*)^j, n > 0$$

$$\theta^{(2)}(n) = \sum_{j=0}^{n-1} (j-1)(z^*)^j, n > 0$$

$$\theta^{(3)}(n) = \sum_{j=0}^{n-1} (j-1)(j-2)(z^*)^j, n > 0$$

$$\theta^{(1)}(n) = -\sum_{j=1}^{-n} (z^*)^{-j}, n < 0$$

$$\theta^{(2)}(n) = \sum_{j=1}^{-n} (j+1)(z^*)^{-j}, n < 0$$

TABLE A-continued $$\theta^{(3)}(n) = -\sum_{j=1}^{-n} (j+1)(j+2)(z^*)^{-j}, n < 0$$

$$\theta^{(i)}(0) = 0, \quad i = 1, 2, 3$$

$$A_s^{(1)} = [\mathcal{B}(\mathcal{B} - 1 + z^*) + (2\mathcal{B} - 1 + z^*)(\mathcal{B}^{(1)} - \mathcal{B})]\theta^{(1)}(d_s) +$$
$$\mathcal{B}^{(2)}[\mathcal{B}\theta^{(2)}(d_s) + d_s(z^*)^{d_s}] +$$
$$\mathcal{B}^{(3)}[\mathcal{B}\theta^{(3)}(d_s) + d_s(d_s - 1)(z^*)^{d_s}]$$

$$A_s^{(2)} = \mathcal{B}^{(2)}(\mathcal{B} - 1 + z^*)\theta^{(1)}(d_s) + 2\mathcal{B}^{(3)}d_s(z^*)^{d_s}$$

$$A_s^{(3)} = \mathcal{B}^{(3)}(\mathcal{B} - 1 + z^*)\theta^{(1)}(d_s)$$

$$\mathcal{W} = \sum_{s=1}^{S} v_s d_s^2 (d_s^3 - 10d_s^2 + 35d_s - 50)(z^*)^{d_s}$$

$$E = \frac{[1 - 3z^* + 3(z^*)^2]}{(1-z^*)^3} + \frac{T(1-2z^*)}{2V(1-z^*)^2} +$$
$$\frac{1}{8}\left[\frac{5T^2}{3V^2} - \frac{Y}{V}\right]\frac{1}{(1-z^*)} - \frac{V\sqrt{V}\,\text{sgn}(1-z^*)}{[-2F(z^*)]^{3/2}}, z^* \neq 1$$

$$E = 1 + \frac{T}{2V} + \frac{5T^2}{24V^2} + \frac{35T^2}{432V^3} - \frac{Y}{8V}\left(1 + \frac{5T}{6V}\right) + \frac{\mathcal{W}}{40V}, z^* = 1$$

EXAMPLE

We briefly describe the results of our computational experiments based on the methods described above. The infrastructure network, shown in FIG. 1, has 8 nodes and 24 OC3 links connecting 10 pairs of nodes in both directions. There are 6 services, with effective bandwidth of individual calls being 16, 48, 64, 96, 384 and 640 Kbps, respectively, over all links.

There are 4 VPNs for the West, Mid West, East and South Corporation, respectively. These are all national customers with traffic from every node to every node, for each of the services, with the traffic patterns for individual corporations exhibiting some preponderance of traffic to and from the nodes in the geographical areas corresponding to their names. The admissible routes are such that there are at most 4 hops in the route.

Table I gives a summary of the offered and carried bandwidth over the VPNs for the optimized design. Of particular importance is the absence of significant variability in the blocking for the VPNs.

TABLE I

Summary Statistics for the Optimized Design

| VPN | West | Mid West | East | South | Total |
|---|---|---|---|---|---|
| Offered Bandwidth | 18484 | 17269 | 23167 | 15758 | 74679 |
| Carried Bandwidth | 17904 | 16739 | 22530 | 15230 | 72400 |
| Blocking (%) | 3.14 | 3.07 | 2.75 | 3.35 | 3.05 |

We compare the above results with those obtained by the Complete Sharing design in which the VPN structure is eliminated and the aggregate traffic is optimally routed. The total carried bandwidth in the Complete Sharing solution is 73,795, which gives 1.2% blocking. Hence about 1.85% incremental blocking is due to the partitioning of resources among the VPNs.

In Table II we consider link 20.2 (see FIG. 1) and give the capacity allocations to the VPNs in the optimized design.

TABLE II

Link 20.2 (capacity = OC3)

| VPN | | West | Mid West | East | South |
|---|---|---|---|---|---|
| Relative Capacity Allocation to VPN (%) | | 32.9 | 25.0 | 24.9 | 17.1 |
| Relative Utilization in VPN by service | 1 | 1.0 | 0.3 | 2.1 | 1.8 |
| " | 2 | 2.7 | 0.1 | 6.2 | 5.7 |
| " | 3 | 7.3 | 0.6 | 16.7 | 14.7 |
| " | 4 | 4.6 | 0.3 | 12.4 | 10.8 |
| " | 5 | 21.7 | 23.2 | 14.0 | 38.7 |
| " | 6 | 62.7 | 75.5 | 48.6 | 28.3 |
| Total Utilization in VPN (%) | | 82.6 | 79.2 | 83.4 | 80.5 |

Also given in the table are the utilization by each of the six services. Quite remarkable is the lack of significant variability in the utilization of the link by the VPNs.

Only 10 outer iteration were necessary to meet the convergence threshold of $10^{-3}$. Table III gives the total carried bandwidth after even numbers of iterations. Particularly noteworthy is the goodness of the initial design, which is a VPN design based on the Complete Sharing solution.

TABLE III

Convergence in the Design Process

| Iterations | 0 (initial) | 2 | 4 | 6 | 8 | 10 (converged) |
|---|---|---|---|---|---|---|
| Carried Bandwidth | 72042 | 72207 | 72308 | 72359 | 72384 | 72400 |

The invention claimed is:

1. A method for allocating bandwidth capacity on links of a communication network that supports plural subnetworks and plural communication services, and in which sets of permissible routes are defined between respective source-destination pairs for each said subnetwork and service, wherein:

the method comprises, in each of two or more iterations:
(a) partitioning the bandwidth capacity of each of at least some links of the network among the subnetworks that share that link; and
(b) in each of two or more subnetworks, for each service and for each source-destination pair served thereby, determining a traffic rate to be offered to each permissible route between said source-destination pair;

at least one instance of (a) is based on an allocation of traffic rates resulting from a prior instance of (b); and
at least one instance of (b) is based on a partition of link capacity among subnetworks resulting from a prior instance of (a).

2. The method of claim 1, wherein (a) and (b) are carried out so as to maximize a weighted aggregate measure of bandwidth carried by the network, said measure to be referred to as network revenue.

3. The method of claim 2, wherein the network revenue is maximized subject to a constraint that specifies a minimum quality of service in at least one subnetwork.

4. The method of claim 3, wherein the constraint specifies that a respective bandwidth carried by said at least one subnetwork in at least one class of service may not fall below a specified level.

5. The method of claim 4, wherein said bandwidth is the total subnetwork bandwidth carried in said at least one class of service.

6. The method of claim 4, wherein said bandwidth is the subnetwork bandwidth carried in said at least one class of service between at least one specified source-destination pair.

7. The method of claim 4, wherein the specified level is a specified fraction of the total traffic offered to the pertinent subnetwork in at least one class of service.

8. The method of claim 2, wherein (b) is carried out such that the bandwidth allocated to each link is completely partitioned between subnetworks.

9. The method of claim 8, wherein (a) and (b) are carried out iteratively, such that each iteration of (a) is responsive to a prior allocation of bandwidth to links, and at least the second and subsequent iterations of (b) are each responsive to a prior determination of traffic rates to be offered.

10. The method of claim 9, wherein in each iteration, (a) is carried out using a deterministic flow model of network traffic.

11. The method of claim 9, wherein in each iteration, (b) is carried out using a deterministic flow model of network traffic.

12. The method of claim 9, wherein in each iteration, (a) is carried out using a stochastic model of network traffic, and (b) is carried out using a deterministic flow model of network traffic.

13. The method of claim 9, wherein in each iteration, (a) is carried out using a deterministic flow model of network traffic, and (b) is carried out using a stochastic model of network traffic.

14. The method of claim 9, wherein, in each iteration, (a) is carried out independently for each subnetwork.

15. The method of claim 14, wherein (a) is carried out independently for each subnetwork by carrying out respective computations for each subnetwork in parallel.

16. The method of claim 14, wherein, in each iteration, (b) is carried out such that bandwidth is reallocated independently to each link.

17. The method of claim 14, wherein the network revenue is evaluated by summing respective subnetwork revenues from each of the subnetworks, and the method further comprises, in each iteration:
(a) for each link of each subnetwork, calculating a capacity cost that expresses the sensitivity of the pertinent subnetwork revenue to the bandwidth allocated to said link for said subnetwork; and
(b) using the capacity costs to extrapolate from a current subnetwork revenue based on a current set of said bandwidth allocations to a new subnetwork revenue based on a reallocation of said bandwidths.

18. The method of claim 17, wherein each of the capacity costs is a linearized capacity cost.

19. The method of claim 17, wherein:
a respective penalty referred to as an implied cost is associated with each link of each subnetwork for each respective service;
each implied cost acts to reduce an effective revenue per call of the pertinent subnetwork and service that is routed on the pertinent link;
the implied costs reflect probabilities that calls will be lost due to insufficient bandwidth on the various links of each subnetwork; and
step (c) comprises evaluating implied costs.

20. The method of claim 19, wherein a stochastic model is used to describe network traffic, and for at least some links, the evaluation of implied costs is carried out using the Refined Uniform Asymptotic Approximation to express loss probabilities on said links.

21. The method of claim 19, wherein a stochastic model is used to describe network traffic, and for at least some links, the evaluation of implied costs is carried out using exact methods to express loss probabilities on said links.

22. The method of claim 19, wherein the evaluation of implied costs is carried out using a deterministic flow model to express loss probabilities on said links.

23. The method of claim 19, wherein a stochastic model is used to describe network traffic, the evaluation of implied costs is carried out using exact methods to express loss probabilities on at least some links having relatively low capacities, and an asymptotic approximation is used to express loss probabilities on at least some links having relatively high capacities.

24. The method of claim 19, wherein a stochastic model is used to describe network traffic, during at least some relatively early iterations, the evaluation of implied costs is carried out using the Uniform Asymptotic Approximation to express loss probabilities on at least some links, and during at least some relatively late iterations, the evaluation of implied costs is carried out using the Refined Uniform Asymptotic Approximation to Approximation to express loss probabilities on at least some links.

25. The method of claim 9, further comprising, after the last iteration of (b), temporarily reallocating bandwidth in at least one link from at least one subnetwork to at least one other subnetwork.

26. The method of claim 1, wherein:

the method further comprises measuring traffic intensity, in at least one class of service, offered to at least one source-destination pair within at least one subnetwork;

steps (a) and (b) are carried out responsively to said measuring step; and the method further comprises, responsively to (a) and (b), setting at least one operating parameter of a network element.

27. The method of claim 26, wherein the step of setting at least one operating parameter of a network element comprises setting a scheduling weight.

28. The method of claim 1, wherein:

the method further comprises measuring traffic intensity, in at least one class of service, offered to at least one source-destination pair within at least one subnetwork;

steps (a) and (b) are carried out responsively to said measuring step;

the method further comprises, after (a) and (b), making at least one further measurement traffic intensity; and the method further comprises, responsively to said at least one further measurement of traffic intensity, temporarily reallocating bandwidth in at least one link from at least one subnetwork to at least one other subnetwork.

29. The method of claim 28, wherein said step of temporarily reallocating bandwidth in at least one link comprises setting a trunk reservation parameter.

* * * * *